US007509259B2

(12) United States Patent  (10) Patent No.: US 7,509,259 B2
Song  (45) Date of Patent: Mar. 24, 2009

(54) METHOD OF REFINING STATISTICAL PATTERN RECOGNITION MODELS AND STATISTICAL PATTERN RECOGNIZERS

(75) Inventor: Jianming J. Song, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 608 days.

(21) Appl. No.: 11/018,271

(22) Filed: Dec. 21, 2004

(65) Prior Publication Data

US 2006/0136205 A1    Jun. 22, 2006

(51) Int. Cl.
   *G10L 15/14*  (2006.01)
   *G10L 15/00*  (2006.01)
(52) U.S. Cl. ............. 704/256.2; 704/243; 704/255; 704/256
(58) Field of Classification Search ........ 704/236, 704/240, 243–245, 256.2
   See application file for complete search history.

(56) References Cited

U.S. PATENT DOCUMENTS

| 5,502,774 | A | * | 3/1996 | Bellegarda et al. ........ 382/159 |
| 5,590,242 | A | * | 12/1996 | Juang et al. ............. 704/245 |
| 5,737,489 | A | * | 4/1998 | Chou et al. ............. 704/256 |
| 5,737,723 | A | * | 4/1998 | Riley et al. ............. 704/243 |
| 5,749,069 | A | * | 5/1998 | Komori et al. ........... 704/240 |
| 5,806,029 | A | * | 9/1998 | Buhrke et al. ........... 704/244 |
| 5,822,729 | A | * | 10/1998 | Glass .................. 704/255 |
| 6,138,097 | A | * | 10/2000 | Lockwood et al. ........ 704/256.2 |
| 6,182,039 | B1 | * | 1/2001 | Rigazio et al. .......... 704/257 |
| 6,728,674 | B1 | * | 4/2004 | Griniasty .............. 704/256 |
| 7,103,544 | B2 | * | 9/2006 | Mahajan et al. ......... 704/240 |

OTHER PUBLICATIONS

Ljolje et al., "Estimation of Hidden Markov Model Parameters By Minimizing Empirical Error Rate", ICASSP, Apr. 1990.*
Brodley et al., "Identifying Mislabeled Training Data", Journal of Artificial Intelligence Research 11, 1999.*
Hiroshi Shimodaira, Jun Rokui, Mitsuru Nakai; "Improving the Generalization Performance of the MCE/GPD Learning", 1998.

* cited by examiner

*Primary Examiner*—Patrick N Edouard
*Assistant Examiner*—Douglas C Godbold
(74) *Attorney, Agent, or Firm*—Sylvia Chen; Philip A. Premysler (57) ABSTRACT

A device (800) performs statistical pattern recognition using model parameters that are refined by optimizing an objective function that includes a term for many items of training data for which recognition errors occur wherein each term depends on a relative magnitude of a first score for a recognition result for an item of training data and a second score calculated by evaluating a statistical pattern recognition model identified by a transcribed identity of the training data item with feature vectors extracted from the item of training data. The objective function does not include terms for items of training data for which there is a gross discrepancy between a transcribed identity and a recognized identity. Gross discrepancies can be detected by probability score or pattern identity comparisons. Terms, of the objective function are weighted based on the type of recognition error and weights can be increased for high priority patterns.

22 Claims, 8 Drawing Sheets

METHOD OF REFINING STATISTICAL PATTERN RECOGNITION MODELS AND STATISTICAL PATTERN RECOGNIZERS

FIELD OF THE INVENTION

The present invention relates in general to statistical pattern recognition.

BACKGROUND OF THE INVENTION

The high computational power that is widely available at present in desktop and even handheld devices has opened up the possibility of widespread use of statistical pattern recognition for a variety of applications. Some examples of applications of statistical pattern recognition include: speech recognition, handwriting recognition, and face recognition. Beyond the foregoing familiar uses, there are numerous specialized applications.

In broad overview, an archetypical statistical pattern recognition system works as follows. First raw data is collected from the thing to be recognized. For example, for face recognition a photograph is taken of a face to be recognized, and for speech recognition, spoken words to be recognized are input through a microphone. The raw data has a relatively high byte size, includes noise and includes a great deal of minor statistical variations. For example, in examining audio waveforms of different or even the same person saying the same word many times, it will be seen that no two waveforms are identical, even though the underlying pattern (e.g., the word to be recognized) is the same. Such variability makes pattern recognition challenging.

Once the raw data has been collected, it is subjected to feature extraction. Typically, the role of feature extraction is to extract essential information from the raw data, by projecting the relatively high-byte-size raw data onto a finite dimensional orthogonal basis. The details of the feature extraction process are outside the focus of the present description. The byte size of the extracted feature vector(s) is generally lower than that of the raw data.

Next, the feature vectors are plugged into a number of statistical pattern recognition models, each representing a different pattern (e.g., face or pronounced word), in order to determine the statistical pattern recognition model that yields the highest probability score, and thereby identify the pattern (e.g., word, face) in the raw data. One example of a statistical pattern recognition model is a mixture (weighted sum) of several multidimensional probability density functions (e.g., Gaussians). This is a kind of generalization of the familiar one-dimensional Gaussian distribution. A mixture is used because a given pattern (e.g., the letter v written in script) appears in two or more variants. For example, words may be written or pronounced in two or more different ways. Note, however, that the use of mixtures to handle multiple variants of each pattern to be recognized also increases the danger that a variant of one pattern (e.g., the written letter v) might be mistaken for a variant of another pattern (e.g., the written letter u), leading to a recognition error.

Prior to using the statistical pattern recognition models in performing recognition, models are 'trained.' The object of training is to determine the parameters (e.g., vector means, variances, and mixture component weights) of each particular statistical pattern recognition model, so that each particular model yields the highest probability score compared to other models when evaluated using feature vectors extracted from raw data including the pattern that the model is intended to recognize. Typically, a set of training data samples is used to train each statistical pattern recognition model. The set includes many different versions of the same pattern, for example the word seven spoken by 100 different people.

Typically, each model's parameters are adjusted using an iterative optimization scheme to maximize a summed probability score for the set of training data scores for the model. In order to use training data, the identity of the pattern or patterns present in the training data needs to be known so that it can be used to train the correct model. The identity of each pattern is typically transcribed by a human transcriber. Because large amounts of training data are often used, human error leads to a certain percentage of error in the transcribed identities. Such errors can lead to poor training and degraded recognition performance.

In pattern recognition systems, there is a tradeoff between the computational cost of running a system, which depends on factors such as the dimension of the feature vectors, and the number of mixture components in each statistical pattern model, and the accuracy of the system (i.e., the percent of correct recognitions achieved). In handheld devices in particular, it is desirable to control the computational cost, because high computational cost implies quicker battery depletion. In all pattern recognition systems, it is desirable to improve accuracy. Thus, there is, in general, a desire to improve accuracy and, for handheld devices, to do so without increasing computation cost.

BRIEF DESCRIPTION OF THE FIGURES

The present invention will be described by way of exemplary embodiments, but not limitations, illustrated in the accompanying drawings in which like references denote similar elements, and in which.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Figure 1:
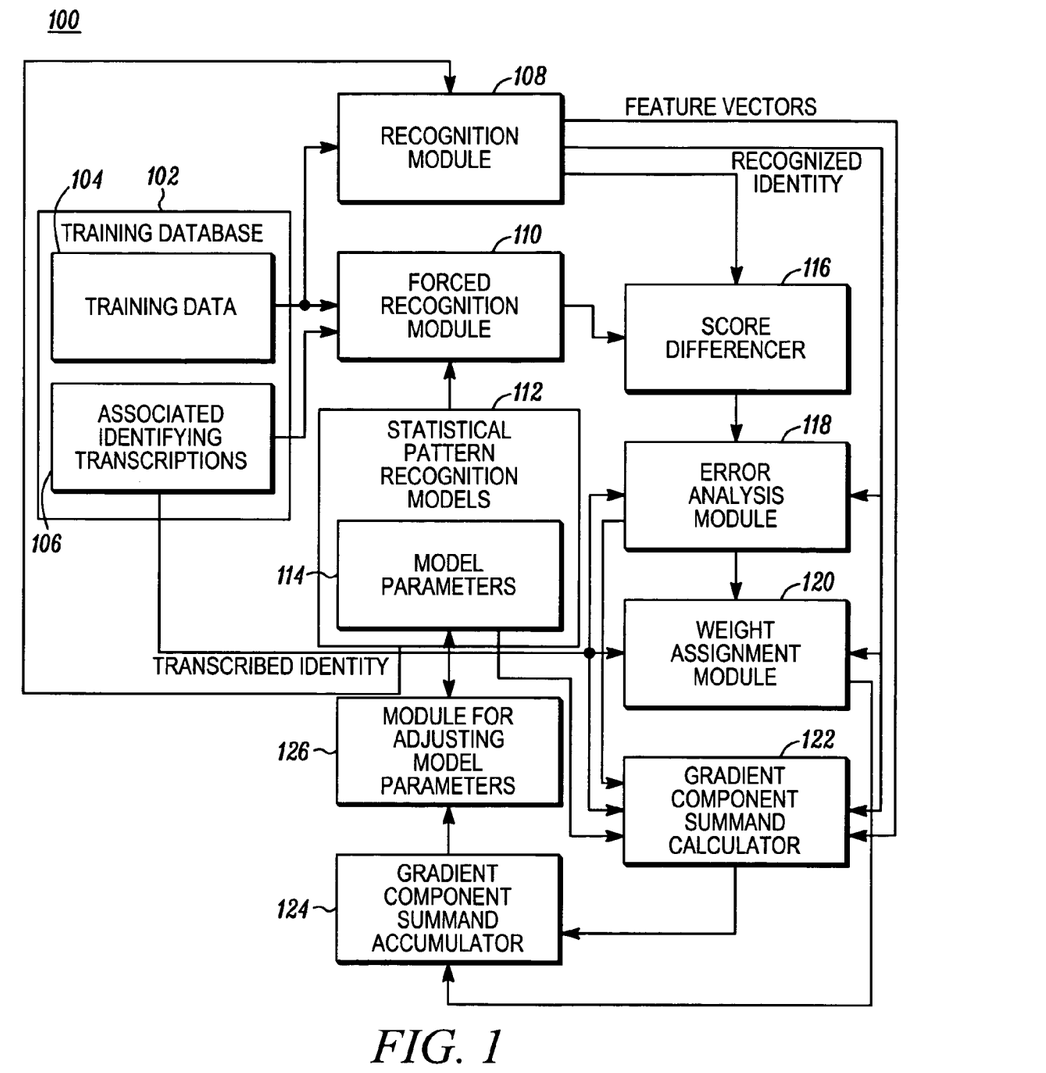
FIG. 1 is a block diagram of a system for refining statistical pattern recognition models.

FIG. 1 is a block diagram of a system 100 for refining statistical pattern recognition models. The system comprises a training database 102 that includes a set of training data 104 and associated identifying transcriptions 106. The training data 104 suitably includes many, for example several thousand, pieces of training data. The associated identifying transcriptions 106 include a transcribed identity for each piece of training data. The associated identifying transcriptions 106 are typically prepared by a human transcriber.

The training data 104 is coupled to a recognition module 108 and a forced recognition module 110. The recognition module 108 and the forced recognition module 110 both use a set of statistical pattern recognition models 112 that include model parameters 114. The recognition module 108 performs statistical pattern recognition on each item of the training data 104 and outputs a recognized identity and a first probability score for the recognized identity. Note that the recognized identity is the recognized identity for an item of training data by virtue of the fact that a statistical pattern recognition model associated with the recognized identity yields the highest probability score (the first probability score) among all of the statistical pattern recognition models 112 used by the recognition module 108 when evaluated with a feature vector or vectors extracted from the item of training data.

The forced recognition module 110 calculates a second probability score for each particular item of training data 104 by evaluating a statistical pattern model identified by the associated identifying transcription 106 for the particular item of training data. If the recognition module 108 does not recognize the item of training data correctly, or if the transcribed identity for the item of training data is erroneous, the recognized identity output by the recognition module 108 will not match the transcribed identity, and the first and second probability scores will, in general, differ. As will be explained further below, the system 100 serves to reduce errors by the recognition module 108 (and pattern recognition systems used outside of the system 100 for real recognition tasks) even if there are errors in some of the associated identifying transcriptions 106. Although not shown in FIG. 1, the same feature vector extraction process can be used for both the recognition module 108 and the forced recognition module 110.

The first probability score and the second probability score are supplied to a score differencer 116 which calculates the difference between the two scores. The difference is supplied to an error analysis module 118. The error analysis module 118 also receives the recognized identity from the recognition module 108 and the transcribed identity from the associated identifying transcriptions 106. By comparing the difference between the two scores and comparing the recognized identity with the transcribed identity for each item of training data, the error analysis module 118 is able to determine if there is a gross discrepancy between the recognized identity and the transcribed identity. A gross discrepancy can be due to a human transcription error in the associated identifying transcriptions 106 or a recognition error that is due to, as yet, less than optimally trained pattern recognition models 112 used by the recognition module 108 and the forced recognition module 110. If, for a particular item of training data, a gross discrepancy occurs, the system 100 does not attempt to tune the statistical pattern recognition models 112 in an attempt to eliminate the gross discrepancy. Rather the system will disregard, at least temporarily, the particular item of training data for which the gross discrepancy occurred.

A weight adjustment module 120 also receives the recognized identity and the transcribed identity for each item of training data. Based on the transcribed identity, the recognized identity and/or a comparison of the two, the weight adjustment module 120 determines a weight that will be assigned to gradient component summands that are computed based a particular item of training data. Weights need not be computed for items of training data for which a gross discrepancy was found.

A gradient component summand calculator 122 uses the recognized identity from the recognition module 108, the transcribed identity from the identifying transcriptions 106, feature vectors extracted from the training data, and the model parameters 114 to calculate summands of components of a gradient of an objective function that is a function of the model parameters 114 of the statistical pattern recognition models 112. For each item of training data, summands of gradient components which are derivatives of the objective function with respect to model parameters 114 of the statistical pattern recognition model corresponding to the recognized identity and with respect to model parameters 114 of the statistical pattern recognition model corresponding to the associated identifying transcription 106 for the item of training data are calculated. As such, each item of training data does not give rise to gradient component summands for all of the model parameters 114 for all of the statistical pattern recognition models 112. The objective function is of such character, as will be described further below, that optimizing the objective function in terms of the model parameters 114 adjusts the values of the model parameters 114 such that improved statistical pattern recognition performance will be achieved. The error analysis module 118 signals the weight assignment module 120 and the gradient component summand calculator 122 not to process training data items for which a gross discrepancy has occurred.

A gradient component summand accumulator 124 receives the gradient component summands calculated by the gradient component summand calculator 122, and weights assigned by the weight assignment module 120 for gradient component summands derived from each item of training data. The gradient component summand accumulator 124 calculates weighted sums of the gradient component summands over a large training data set that includes numerous examples of many if not all of the different patterns (e.g., faces or words) that are to be recognized by the recognition module 108. Summands for each gradient component are summed separately. According to certain embodiments, the sums computed by the gradient component accumulator 124 do not include summands based on training data that was correctly identified. Additionally, the sums computed by the gradient component accumulator 124 do not include summands based on training data items for which there is a gross discrepancy between the recognized identity and the transcribed identity. By excluding summands for the latter case, mistuning the model parameters 114 based on erroneous transcriptions is avoided. In the case that a gross discrepancy occurs for a particular item of training data, not withstanding the fact that the associated identifying transcription 106 is correct, excluding gradient component summands based on the particular item of training data avoids trying to make major adjustments to the model parameters 114 in one iteration, and thereby avoids numerical instabilities.

A module for adjusting the model parameters 126 adjusts the model parameters 114 by applying a gradient-based optimization method (e.g., steepest descent method) to the objective function. The gradient component sums produced by the accumulator 124 are the gradient components of the objective function. By basing the adjustment of the model parameters 114 on many different items of training data for which recognition errors occur, (excluding those for which gross discrepancies occur), the demands on the model parameters are balanced such that an overall reduction of recognition errors is achieved. In doing so, the desire for each statistical pattern recognition model to achieve a high probability score for a range of variations of a particular pattern it is intended to match (recognize) is balanced with the desire to produce a low probability score for variations of one or more patterns that may be somewhat confusable with the particular pattern.

By way of example, for speech recognition, a pattern to be recognized (e.g., a word) is often modeled as a Hidden Markov Model (HMM). According to HMM theory, audible speech is assumed to arise from a sequence of underlying or hidden states. States are active during a succession of short intervals of time, e.g., 10 milliseconds, and give rise to vocalized sounds termed emissions. Each spoken word, such as 'one' or 'five' is associated with a particular sequence of states. One set of parameters of the HMM statistical pattern model of a particular word is a set of transition probabilities between successive states. Note that there is a finite 'transition' probability that the HMM will remain in the same state for two successive intervals.

A second set of parameters of the HMM statistical pattern model of a particular word are the vector means, covariances, and weights of multidimensional probability density functions (e.g., a multidimensional Gaussian mixtures) that gives the a posteriori probability that the HMM was in a given state during a particular interval, given a feature vector that was derived from a vocalized sound produced during the particular interval. Expressed mathematically, a log-likelihood statistical pattern model of a postulated word can be written as:

EQU. 1:

$$P(O|\lambda) = \sum_{t=0}^{T} \log(b_{S_t}(O_t)) + \sum_{t=0}^{T} \log(a_{S_{t-1},S_t})$$

where, $P(O|\lambda)$ is the a posteriori probability that a word identified with a sequence of states $\lambda$ was spoken, given that a sequence of vocalized sounds characterized by a sequence of feature vectors $O$ was detected;

$b_{S_t}(O_t)$ is the a posteriori probability that the underlying HMM of the postulated word was in a state S during the $t^{th}$ interval, given that a vocalized sound characterized by a feature vector $O_t$ was detected during the $t^{th}$ time interval; and $a_{S_{t-1},S_t}$ is the transition probability between a state postulated for a $(t-1)^{th}$ interval for the word and a state postulated for the $t^{th}$ interval for the word.

Typically $b_S(O_t)$ is a Gaussian mixture of the form:

EQU. 2:

$$b_S(O_t) = \sum_{n=1}^{N} c_n \cdot \frac{1}{\sqrt{(2\pi)^m |\Sigma_n|}} e^{-\frac{1}{2}(O_t - \mu_n)^T (\Sigma_n)^{-1}(O_t - \mu_n)}$$

where, $C_n$ is the weight of the $n^{th}$ mixture component;

m is the dimension of the feature vectors $O_t$;

$\Sigma_n$ is the covariance matrix for the $n^{th}$ mixture component (the feature vector extraction is typically designed to make $\Sigma_n$ diagonal, so as to reduce information redundancy)

$\mu_n$ is the vector mean of the $n^{th}$ mixture component

In as much as the sequence of states is hidden, in order to perform pattern recognition, the Viterbi algorithm or other search algorithm is typically used to find a sequence of states (corresponding to one particular word) that maximizes the log-likelihood statistical pattern model given by equations one and two.

The foregoing is but one example of a statistical pattern recognition model to which the teachings described herein may be applied. It will be apparent to one skilled in the art that the teachings described herein are applicable to a variety of statistical pattern recognition applications that use a variety of types of statistical pattern recognition models.

Figure 2:
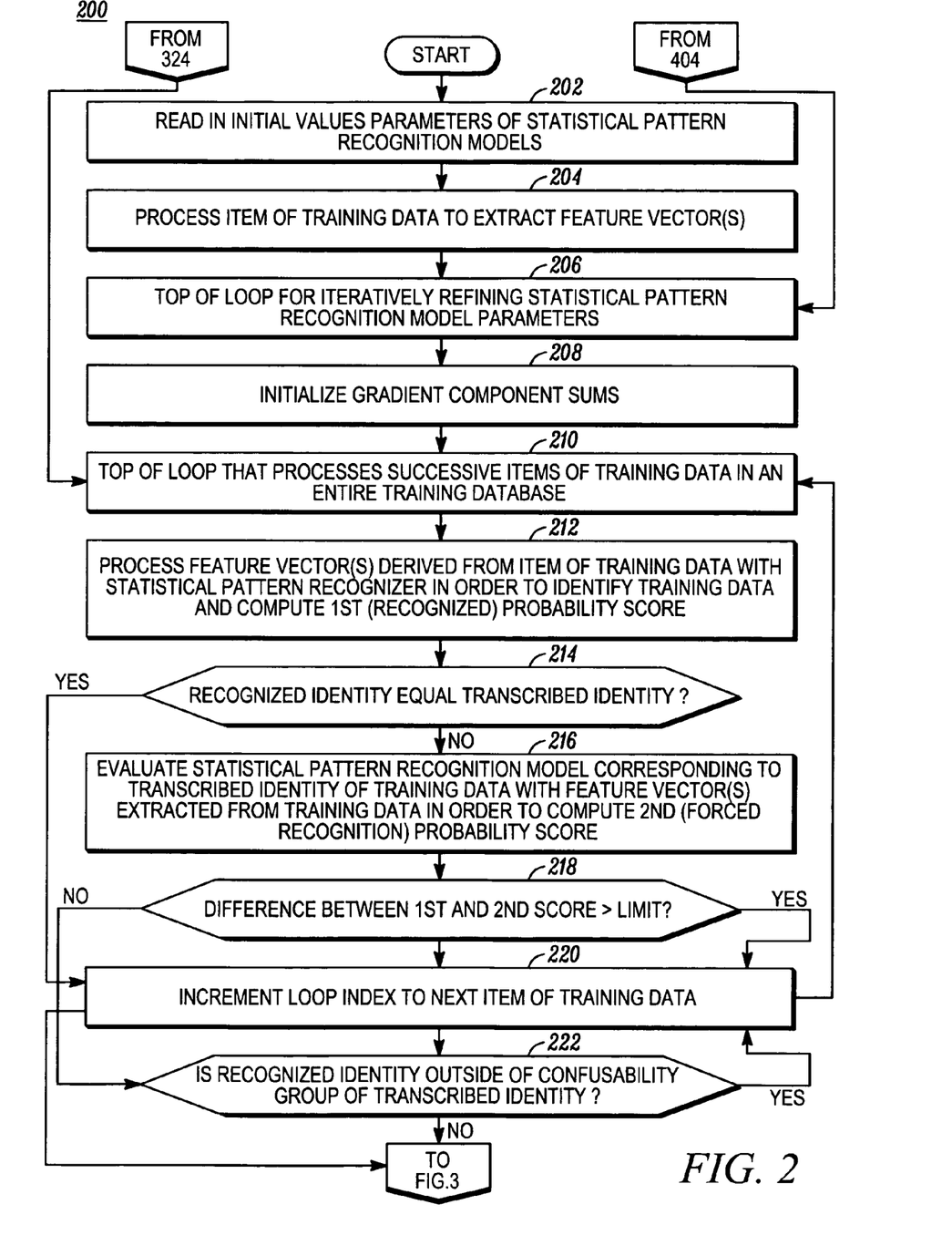
FIG. 2 is a first part of a flowchart of a method of refining statistical pattern recognition models and using resulting refined statistical pattern recognition models to perform pattern recognition.
Figure 3:
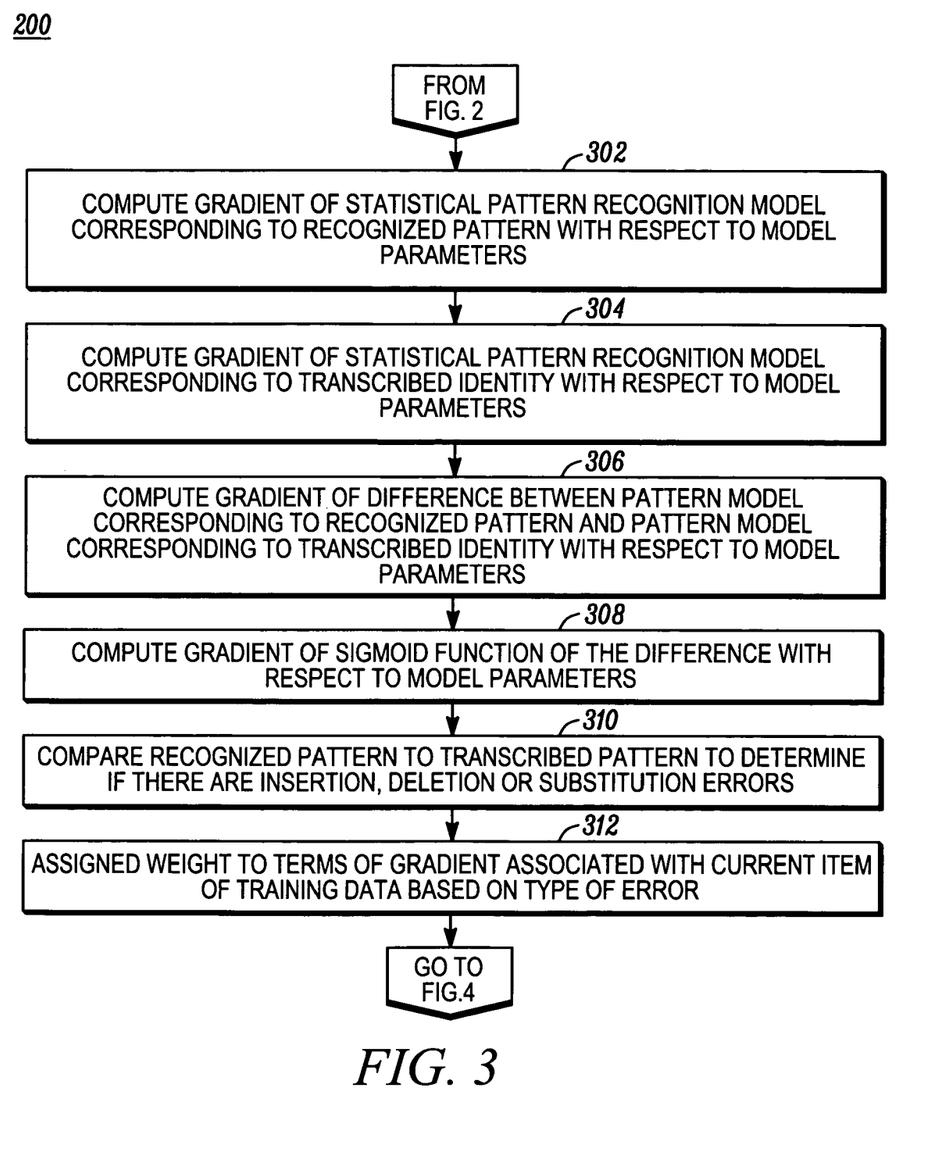
FIG. 3 is a second part of the flowchart begun in FIG. 2.
Figure 4:
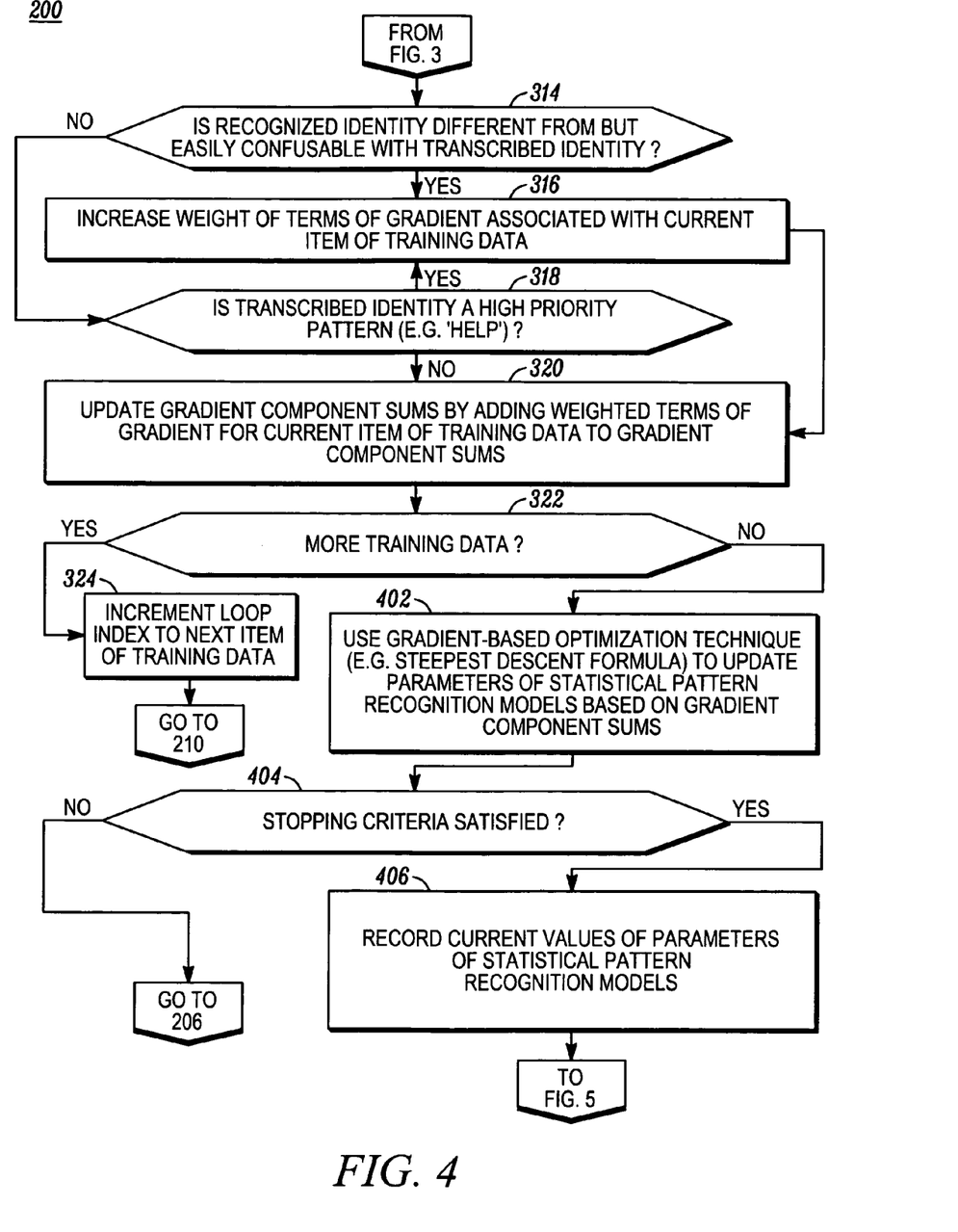
FIG. 4 is a third part of the flowchart begun in FIG. 2.

In general, the objective function used in the system shown in FIG. 1 and in the method to be described with reference to FIGS. 2-4 is of such character that its magnitude depends on the magnitude of a statistical pattern recognition model corresponding to a recognized identity compared to a magnitude of statistical pattern recognition model corresponding to a transcribed identity when evaluated with feature vectors derived from each of a plurality of items of training data. The magnitude of the objective function depends on numerous items of training data.

According to certain embodiments, the magnitude of the objective function depends on all items of training data for which there is a discrepancy that is not a gross discrepancy between a transcribed identity and a recognized identity. According to certain embodiments, the magnitude of the objective function depends on the difference between the magnitude of the statistical pattern model corresponding to the recognized identity and the statistical pattern model corresponding to the transcribed identity when evaluated with feature vectors extracted from the training data. According to one alternative, the objective function depends on the ratio of the magnitude of the statistical pattern model corresponding to the recognized identity to the magnitude of the statistical pattern model corresponding to the transcribed identity when evaluated with feature vectors extracted from the training data. In the former case, the difference can be written in mathematical notation as:

EQU. 3:

$$d(O) = P(O|\lambda_{recognized}) - P(O|\lambda_{transcribed})$$

where, the first term is a probability score (magnitude) calculated by evaluating the statistical pattern model $\lambda_{recognized}$ corresponding to the recognized identity with feature vectors O extracted from an item training data and the second term is a probability score (magnitude) calculated by evaluating the statistical pattern model $\lambda_{transcribed}$ corresponding to the transcribed identity with the feature vectors O extracted from the item training data.

In the case of speech recognition described above, the terms of equation three are of the form indicated in equations one and two. For other applications, other appropriate statistical pattern recognition models are used.

According to certain embodiments, the objective function includes a plurality of terms of the form:

EQU. 4:

$$l(O) = \begin{cases} 2\left(\dfrac{1}{1+\exp(-\gamma d(O))} - 0.5\right) & \text{for } 0 < d(O) < \text{LIM} \\ 0, & \text{otherwise} \end{cases}$$

where gamma is a predetermined constant. The form of the terms given by the first part of equation four is a sigmoid function with the difference given in equation three as the argument. Per equation four, if d(O) exceeds a predetermined limit, LIM, which is used to judge if a gross discrepancy has occurred, equation four evaluates to zero. In equation 4, if d(O)=0, i.e., if the first probability score (calculated by block 108) and the second probability score (calculated by block 110) are identical, which generally implies that a pattern was correctly recognized, equation four also evaluates to zero. The maximum value of equation 4 is one. Thus, for suitably high values of gamma, equation 4 approximates a misrecognition count in that it evaluates to a value approaching 1 if an error (other than a gross discrepancy) occurs and evaluates to zero if no error occurs. For voice recognition applications the inventors have determined that a value of gamma in the range of two to five works well. The limit LIM is a pre-determined value that is selected to disregard gross recognition errors in the objective function.

For certain embodiments, the objective function is a weighted sum or alternatively a simple sum of terms of the form given by equation four taken over all the items of training data for which there is a discrepancy, but not a gross discrepancy between the recognized identity and the transcribed identity. (In certain cases, gross discrepancies are associated with a high value of d(O) in which cases equation four evaluates to zero.) Note that in practice, equation three evaluates to zero in cases that the recognized identity matches the transcribed identity, and in such cases the gradient of terms of the form given by equation four would be zero. Thus, in such cases it is not necessary to include terms of the form given by equation four in such weighted sums or simple sums. Expressed in mathematical notation the weighted sum is:

EQU. 5:

$$OBJ = \sum_{training\_data} w \cdot l(O)$$

where, w is a weight.

Note that equation five is differentiable so that its gradient is calculable. This fact allows derivative-based optimization methods, such as the path of steepest descent method, to be used for optimization. The objective function given by equation five and alternatives thereto depends on parameters of the statistical pattern recognition models that were involved in each recognition error (excluding training data that led to gross discrepancies in some embodiments) for each optimization iteration, including both the statistical pattern recognition model associated with the transcribed identity and the statistical pattern recognition model associated with the presumably erroneously recognized identity.

Thus, by optimizing the objective function given by equation five and alternatives thereto, statistical pattern recognition models associated with the erroneously recognized identities are generally pulled away from each misidentified item of training data, and statistical pattern recognition models corresponding to the transcribed identities are generally pulled toward the misidentified items of training data. In using the objective function given by equation five and alternatives thereto, all of the misidentifications (optionally excluding gross discrepancies) in an entire set of training data (including training data for each pattern to be recognized), are taken into consideration in determining how various model parameters are to be adjusted. In as much, in successive iterations of an optimization routine in which equation five is optimized, terms corresponding to different subsets of the entire training data will contribute to equation five (other terms being equal to zero), equation five is dynamically defined during optimization. The net result is that the objective function given by equation five, or alternatives thereto, leads to a net improvement in recognition performance.

According to alternative embodiments, equation five or alternatives thereto are optimized using an optimization method that uses function evaluations but does not require gradient component evaluations. Routines implementing such optimization methods repeatedly call an objective function (e.g., equation five) in the course of finding an extremum (minimum or maximum). By way of example, such optimization methods include, but are not limited to, simulated annealing, the simplex method and the complex method. The values of the parameters with which the objective function is called, in the course of optimization, is determined by the internal logic of the optimization algorithm, which is outside the focus of the present description.

FIGS. 2-5 show a flowchart of a method 200 of refining statistical pattern recognition models and using resulting refined statistical pattern recognition models to perform pattern recognition. Referring to FIG. 2, in block 202 initial values of model parameters of a number of statistical pattern recognition models are read. The initial values that are read in block 202 can be determined using known methods. In block 204 feature vectors are extracted from items of training data in a set of training data. The details of the process of feature vector vary for each pattern recognition application and are outside the focus of the present description.

Block 206 is the top of a loop for iteratively refining the statistical pattern recognition model parameters. For a first run through the loop commenced in block 206, the initial of model parameters are used. At the end of each run through the loop commenced in block 206 the values (referred to as current values) of the model parameters are updated in preparation for the next run through the loop commenced in block 206. Generally, each iteration of the loop commenced in block 206 refines the values of the model parameters, improving recognition performance. In block 208 gradient component sums of an objective function (e.g., the objective function given in equation five) are initialized to zero. Block 210 is the top of another loop (within the loop commenced in block 206) that processes successive items of training data in an entire training database. The training database includes numerous examples of each pattern that is to be recognized using the statistical pattern recognition models that are initially defined by the parameters read in block 202. In block 212 feature vectors that have been derived from an item of training data corresponding to the current iteration of the loop commenced in block 210 are processed by a statistical pattern recognizer in order to identify the item of training data (i.e., determine the recognized identity) and compute a first (recognized) probability score for the item of training data. Block 214 is a decision block, the outcome of which depends on whether the recognized identity matches the transcribed identity associated with the item of training data. If not then in block 220 an index that points to successive items of training data is incremented to a next item of training data, and the method 200 loops back to block 210 in order to process the next item of training data. In the embodiment shown in FIG. 2, no further processing occurs in cases that the recognized identity matches the transcribed identity.

If it is determined in block 214 that the transcribed identity does not match the recognized identity, the method 200 continues with block 216 in which a statistical pattern recognition model corresponding to the transcribed identity associated with the item of training data being addressed in the current iteration of the loop commenced in block 210 is evaluated using the feature vectors extracted from the item of training data in order to compute a second (forced recognition) probability score.

Block 218 is a decision block, the outcome of which depends on whether a difference between the first probability score and the second probability score exceeds a predetermined limit. The test performed in block 218 is one way to assess if there is a gross discrepancy between the transcribed identity and the recognized identity. If the aforementioned limit is exceeded, then according to the embodiment shown in FIG. 2 no further processing of the item of training data corresponding to the current iteration of the loop commenced in block 210 is conducted and the method 200 branches to block 220 in order to advance to the next item of training data as previously described.

If in block 218 it is determined that the aforementioned difference is within the predetermined limit, then the method 200 branches to block 222. Block 222 is a decision block, the outcome of which depends on whether the recognized identity is outside of a confusability group for the transcribed identity of the item of training data. One way to define the confusability group for each pattern is based on the probabilities that each pattern will be misrecognized as other patterns. Such probabilities can be calculated prior to performing the method 200, using pattern recognition models based on the initial values of the pattern recognition model parameters. Accordingly, the confusability group for a given pattern would include all other patterns for which the probability that the given pattern would be misrecognized as one of the other pattern is above a first predetermined threshold (lower limit). The first predetermined threshold would be chosen by a system designer based on experience and/or trial and error.

According to another alternative a confusability group is defined for each particular pattern that includes that includes a number of other patterns that are most likely (among all of the patterns to be recognized) to be confused with the particular pattern. According to yet another alternative, the confusability group for a given pattern can be hand selected by the designer based on knowledge of a particular application and recorded in a memory. For example for speech recognition based on the English alphabet, the letters in the so-called E-set (b,c,d,e,g,p,t,v,z) can be assigned to a confusability group of the letter e. The foregoing approaches are appropriate in the common case that erroneous recognitions of each particular pattern tend to misidentify the particular pattern as one of a limited number of a set of patterns to be identified. Using the confusability group test in block 222 is another way to determine if there is a gross discrepancy between the recognized identity and the transcribed identity. The tests performed in blocks 218 and 222 need not be performed in all embodiments. If it is determined in block 222 that the recognized identity is outside the confusability group of the transcribed identity for the item of training data, then the method 200 branches to block 220 and proceeds as previously describe.

If, on the other hand, it is determined in block 222 that the recognized identity is within the confusability group for the transcribed identity, then the method 200 continues with block 302 in FIG. 3. In block 302 the gradient with respect to model parameters of the statistical pattern recognition model corresponding to the recognized identity is computed and in block 304 the gradient with respect to model parameters of the statistical pattern recognition corresponding to the transcribed identity is computed. The gradients that are computed in blocks 302 and 304 are computed at the feature vector(s) extracted from the current item of training data. In block 306 the gradient of the difference (equation three) between the pattern recognition model corresponding to the recognized identity and the pattern recognition model corresponding to the transcribed identity is computed with respect to the model parameters of both models. Block 306 amounts to taking the difference between the results of blocks 302 and 304.

In as much as the statistical pattern recognition model corresponding to the transcribed identity and the statistical pattern recognition model corresponding to the recognized identity do not, in general, share parameters, taking the difference in block 306 (as in equation three) amounts to applying a negative sign to gradient components that are derivatives with respect to parameters of the transcribed identity. There are typically no derivatives with respect to the same parameter from both terms of equation three that are differenced. In block 308 the gradient of the sigmoid function of the difference (equation four) is computed. Each component of the gradient computed in block 308 is a gradient component summand. Using the chain rule, block 308 can be performed by multiplying the results of block 306 by the derivative of the sigmoid function.

In short, blocks 302 to 308 serve to compute derivatives of an unweighted summand of equation five for a particular item of training data with respect to parameters appearing in the unweighted summand. (The determination of the weight for the summand is described hereinbelow.) Although the calculation of the terms of the form given by equation four are shown in four separate blocks 302, 304, 306, 308 in FIG. 3, in practice, the way in which the calculation is coded will depend on the computer language used to implement the method 200 and individual programming style.

For multipart statistical pattern recognition models such as represented in equations one and two, only the gradient components for parameters involved in parts of the model for which the recognized identity differs from the transcribed identity need to be calculated. Gradient terms for parts of the statistical pattern recognition models that are the same will cancel in the difference in equation three. For example, in the case of equation one and two, if the recognized identity and the transcribed identity both identify a particular Gaussian mixture model for a particular interval of speech (characterized by a particular feature vector), then the gradient components with respect to parameters of that particular Gaussian mixture for the particular interval need not be calculated.

In block 310, the recognized pattern is compared to the pattern identified in the associated identifying transcription to determine the type of error, in particular (in certain embodiments) whether an insertion, deletion or substitution error has occurred. In block 312 a weight is assigned to be used for terms of the gradient components that were calculated using the current item of training data based on the type of error. For each type of error, a predetermined weight is suitably used. Selection of the weights can be used to steer the adjustment of model parameters so as to reduce a type or types of errors that were previously more prevalent, e.g. more prevalent using the initial values of the model parameters read in block 202. For example, if prior to using the method 200, pattern recognition resulted in more insertion errors, gradient components derived from training data that yielded an insertion error can be given a greater weight.

Block 314 is a decision block, the outcome of which depends on whether the recognized identity is different from but easily confused with the transcribed identity. For example, in speech recognition the name 'Phil' may be easily confused with the name 'Bill'. The test performed in block 314 can be based on the statistics on the likelihood of confusion of two patterns that are gathered using statistical pattern recognition models as they exist prior to refinement by the method 200. In the latter case the test for confusability is made by comparing the likelihood of confusion to a second predetermined threshold (lower limit). According to such an embodiment, if the likelihood of confusion of the pattern corresponding to the recognized identity and the pattern corresponding to the transcribed identity is above the second threshold, the two patterns are considered highly confusable. The second predetermined threshold which is greater than the first predetermined threshold is chosen by the system designer based on experience and/or trial and error. Alternatively, statistics of the likelihood of confusion can be calculated during each optimization iteration for use in a successive iteration. Alternatively, a recognized identity is considered to be highly confusable with a transcribed identity based on a stored set of rules (e.g., 'Bill' is highly confusable with 'Phil').

If it is determined in block 314 that the pattern corresponding to the recognized identity is highly confusable with the pattern corresponding to the transcribed identity, then the method 200 branches to block 316 in which the weight assigned to gradient components derived from the item of training data corresponding to the current iteration of the loop commenced in block 210 is increased. Increasing the weight in these circumstances places a priority on discriminating patterns that tend to be highly confusable.

If, on the other hand, it is determined in block 314 that the recognized identity for the current item of training data is not highly confusable with the transcribed identity, then the method branches to block 318. Block 318 is a decision block, the outcome of which depends on whether the transcribed identity corresponds to a high priority pattern, for example the word 'help' in a voice communication system. If so, then the program branches to block 316 previously described. Note that the weight can be increased one amount for highly confusable patterns and another amount for high priority patterns.

Multiplication of gradient component summands by a weight is one example of using an emphasis function to emphasize gradient component summands derived from each item of training data for which a recognition error occurs, based on the nature of the error or the identity of the pattern in the training data. Alternatively, other emphasis functions such as, but not limited to, exponentiation with different exponents is used in place of multiplication by different weights. However, multiplication by a weight is a simple linear operation.

If the outcome of block 318 is negative, or after executing block 316, block 320 is reached. In block 320 the gradient component sums that were initialized in block 208 are updated by adding weighted terms of gradient components derived from the current item of training data. In other words, the gradient components summands that were calculated in block 308 and are weighted by weights determined in blocks 310-318 are added to the sums that were initialized in block 208. Alternatively, blocks 310 and 312 and/or 314 and/or 318 are not included in the method 200.

Block 322 is a decision block the outcome of which depends on whether there is more training data yet to be processed. If so, then in block 324 the index that points to successive items of training data is incremented to a next item of training data, and the method 200 loops back to block 210 in order to process the next item of training data. If, on the other hand, there are no more items of training data in the training database that remain to be processed, then the method 200 continues with block 402 in FIG. 4. In block 402 a gradient-based optimization method is used to update model parameters based on the gradient component sums. In using the steepest descent method, gradient model parameters are updated according to the following equation:

EQU. 6:

$$\Theta_k(n+1) = \Theta_k(n) - \varepsilon \frac{\partial OBJ}{\partial \Theta_k(n)}$$

where $\Theta_k(n+1)$ is a calculated value of a $k^{th}$ model parameter for an $(n+1)^{th}$ iteration;

$\Theta_k(n)$ is a calculated value of the $k^{th}$ model parameter for an $n^{th}$ iteration;

OBJ is the objective function, which according to certain aforementioned embodiments is given by equation five; and $\varepsilon$ is a system designer selected parameter called the learning rate (for speech recognition applications values of 0.001 to 0.0001 have been used successfully);

Following block 402, block 404 is a decision block that tests whether one or more stopping criteria has been satisfied. The stopping criteria can for example require that the difference between the value of the objective function in the preceding interation of the loop starting in block 206) and the value of the objective function in the current iteration be less than a second predetermined number. Alternatively, the stopping criteria can require that the error rate for the all the training data 104 in the training database is less than a predetermined percentage. If the stopping criteria are not satisfied, then the method 200 loops back to block 206 in order to run through the previously described steps again in order to further refine the model parameters. If the stopping criteria have been met then in block 406 the current values of the model parameters are considered adequately refined values of the model parameters and are stored for future use, i.e. for use in performing statistical pattern recognition.

The above-described part of the method 200 up to and including block 406 is implemented in a program that is suitably run on a high power parallel computer or computer system. The method 200 can be parallelized by having each of a plurality processors execute blocks 202 to 318 on a portion of the training database, and once the entire training database has been processed, using one processor to add together (component-by-component) the gradient component sums calculated by the plurality of processors, and then using the one processor to execute blocks 320, 402, 404, 406.

Figure 5:
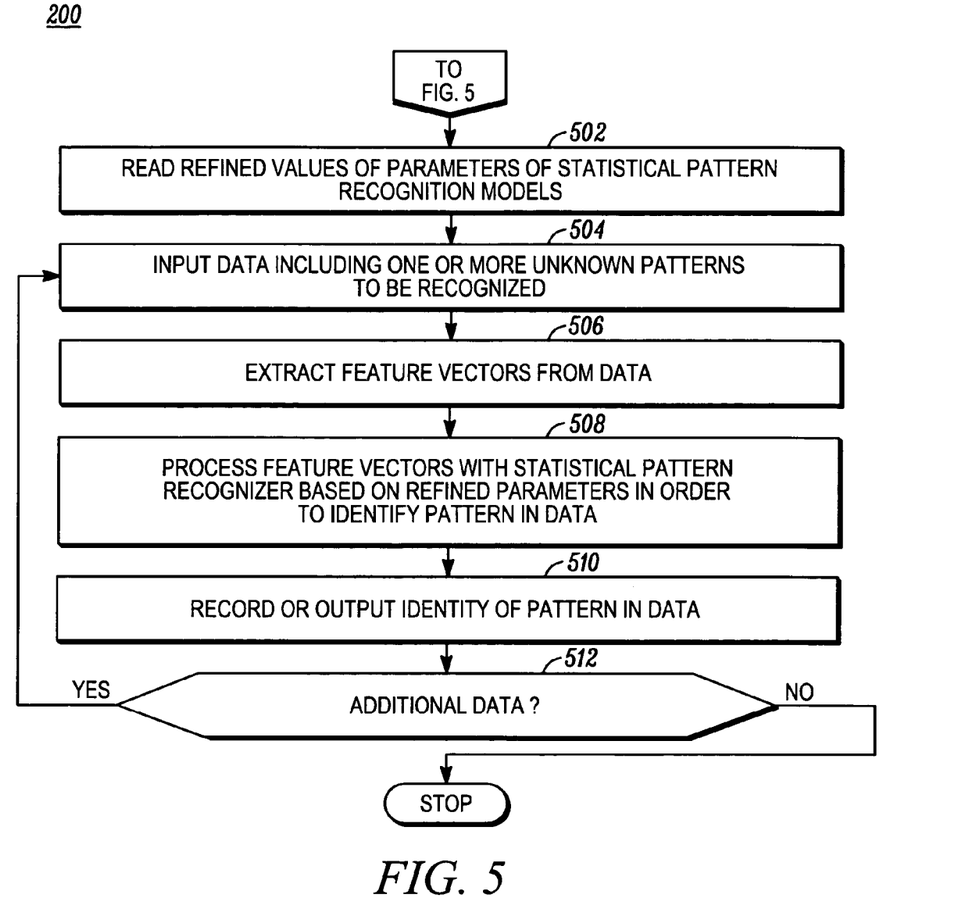
FIG. 5 is a fourth part of the flowchart begun in FIG. 2.

The part of the method shown in FIG. 5 is suitably executed by a single processor, e.g., a processor in a desktop computer, or a processor in a handheld device. The part of the method shown in FIG. 5 uses the refined statistical pattern recognition models to perform statistical pattern recognition.

After block 406, the method 200 continues with block 502 in FIG. 5. In block 502 the refined model parameters, which were stored in block 406, are read. In block 504 data including one or more unknown patterns to be recognized is read. In block 506 feature vectors are extracted from the data read in block 504. In block 508 the feature vectors extracted in block 506 are processed with a statistical pattern recognizer that uses statistical pattern recognition models based on the refined model parameters read in block 502. In block 510 a recognized identity that has been determined by the statistical pattern recognizer is output or recorded. Block 512 is a decision block that depends on whether there is additional data to be processed. If so, the method 200 loops back to block 504 to process the additional data. If not, the method 200 terminates.

Figure 6:
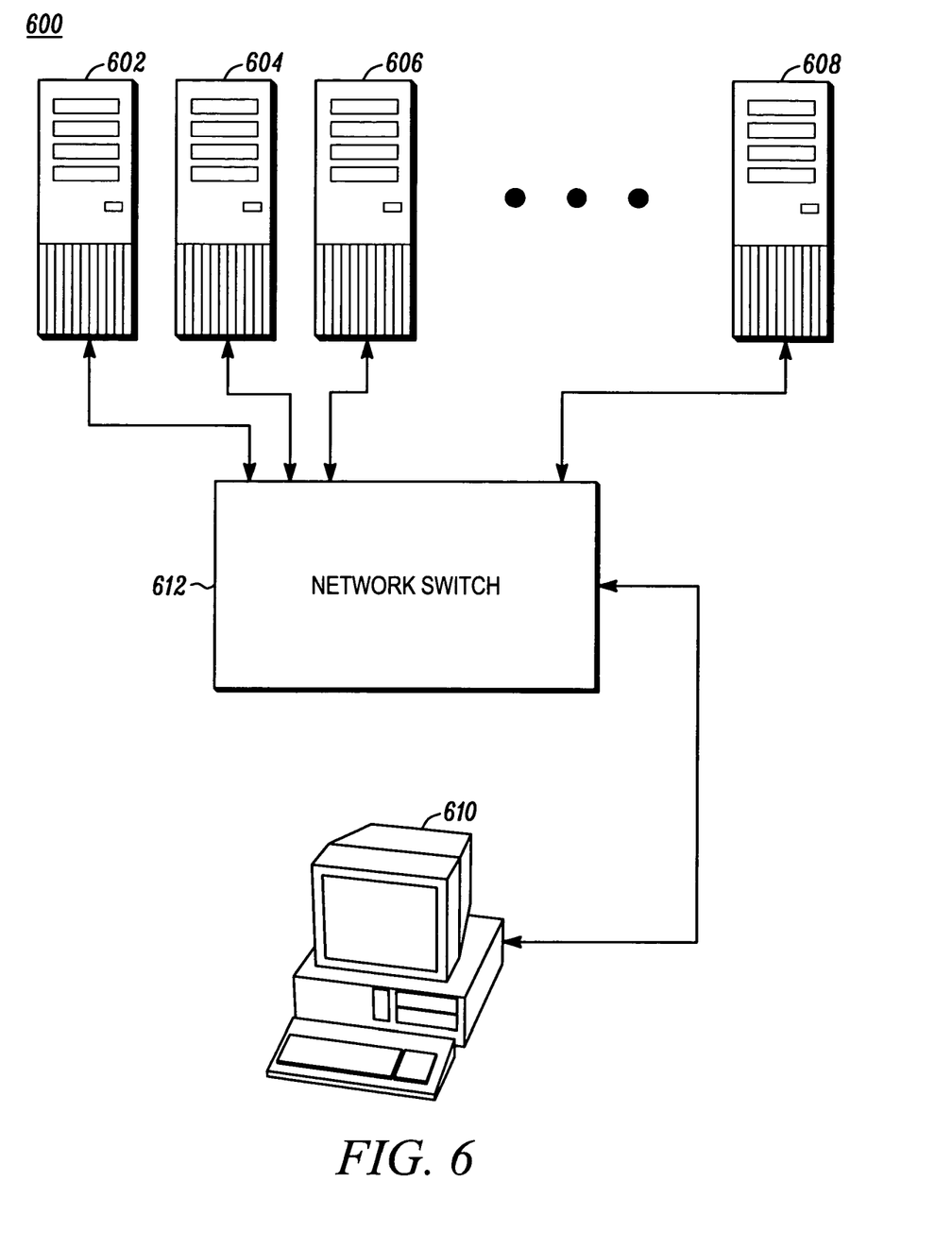
FIG. 6 is a block diagram of a network of computers that is used to execute programs embodying the method shown in FIGS. 2-4.

FIG. 6 is a block diagram of a network of computers 600 that is used to execute programs embodying the part of the method 200 shown in FIGS. 2-4. The network of computers 600 attains a high level of computing power by using multiple computers in parallel. The high level of computing power is useful in executing the part of the method 200 shown in FIGS. 2-4 with a large-size training database. As shown in FIG. 6, the network of computers 600 comprises a plurality of computers including a first processing computer 602, a second processing computer 604, a third processing computer 606, an nth processing computer 608 and an interface computer 610 coupled together through a network switch 612. The interface computer 610 allows a user to load and execute programs on the network 600. The total number of processing computers for such networks is typically in the range of 10 to 50 computers. A program embodying the parts of the method 200 shown in FIGS. 2 and 4 has been executed on a network that included 20 processing computers. One variant of a network of computers used for computing is known as a Beowulf cluster.

Figure 7:
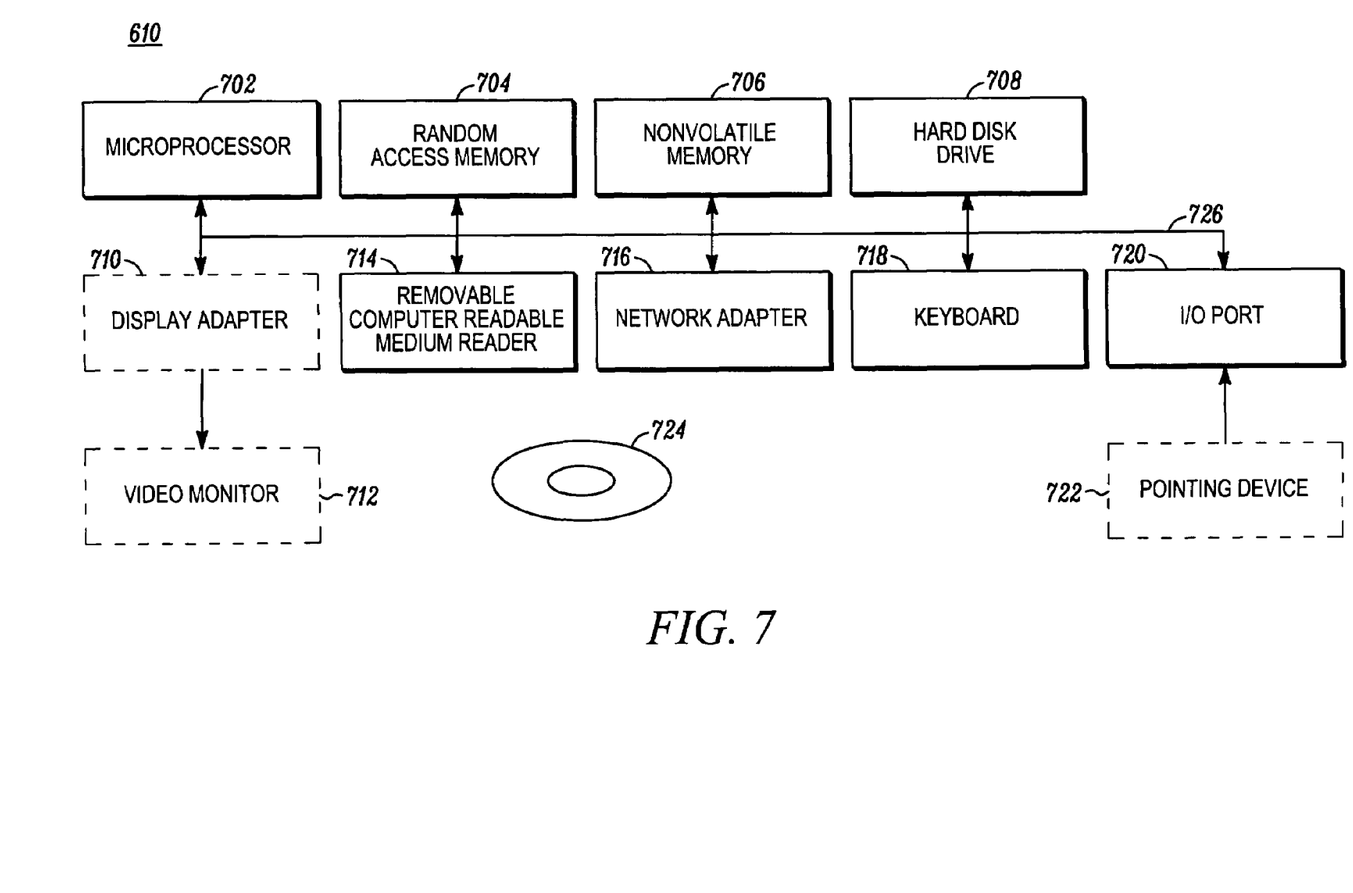
FIG. 7 is a block diagram of a computer used in the network of computers shown in FIG. 6.

FIG. 7 is a block diagram of the interface computer 610 used in the network of computers 600 shown in FIG. 6. The interface computer 610 comprises a microprocessor 702, Random Access Memory (RAM) 704, nonvolatile memory 706, a hard disk drive 708, a display adapter 710 (e.g., a video card), a removable computer readable medium reader 714, a network adapter 716, a keyboard 718, and an I/O port 720 communicatively coupled through a digital signal bus 726. A video monitor 712 is electrically coupled to the display adapter 710 for receiving a video signal. A pointing device 722 (e.g., a mouse) is electrically coupled to the I/O port 720 to allow electrical signals generated by user operation of the pointing device 722 to be input. The network adapter 716 is used to communicatively couple the interface computer 610 to the network switch 612 shown in FIG. 6. The computer readable medium reader 714 suitably comprises a Compact Disk (CD) drive or the like. A computer readable medium 724 that includes software embodying the system and methods described above with reference to FIGS. 1-5 is provided.

The software included on the computer readable medium is loaded through the removable computer readable medium reader 714 in order to configure the network of computers 600 to carry out processes of the current invention that are described above with reference to flow diagrams. Alternatively, the software is loaded from another computer through another network (not shown). The interface computer 610 may, for example, comprise a personal computer or a workstation computer. The processing computers 602, 604, 606, 608 shown in FIG. 6 suitably have the similar components as the interface computer 610, with the exceptions that the processing computers 602, 604, 606, 608 need not include the display adaptor 710, the video monitor 712, or the pointing device 722.

Figure 8:
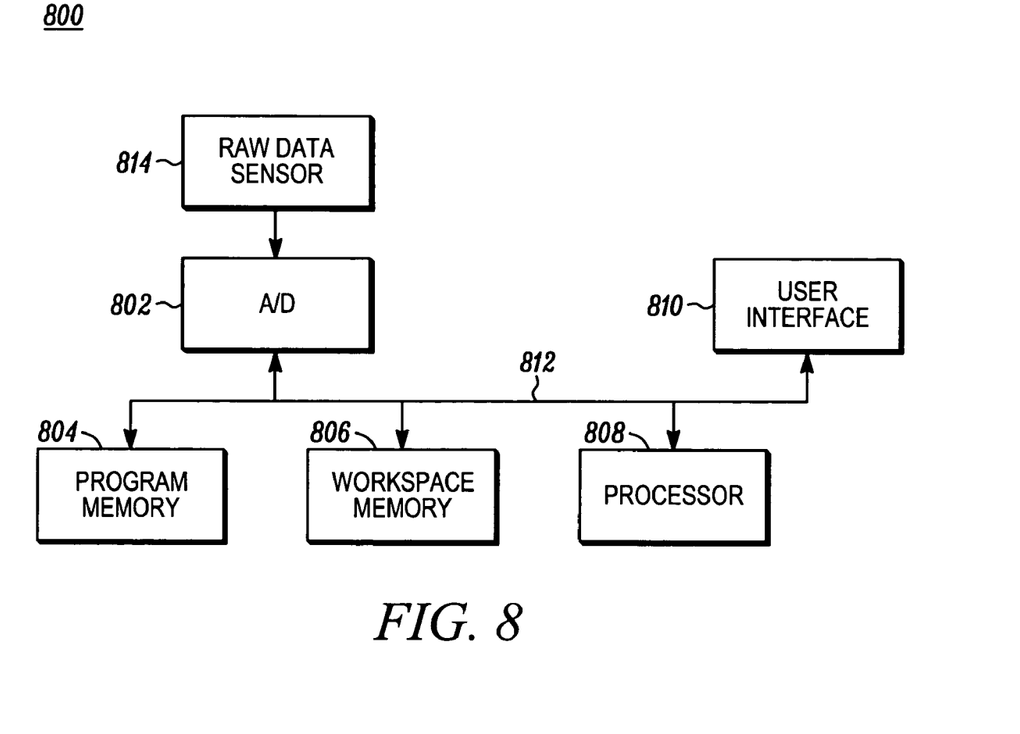
FIG. 8 is a block diagram of a device for performing statistical pattern recognition.

FIG. 8 is a block diagram of a device 800 for performing statistical pattern recognition. The device 800 executes the part of the method 200 shown in FIG. 5. The device 800 comprises an analog-to-digital converter (A/D) 802, a program memory 804, a workspace memory 806, a processor 808 and a user interface 810 coupled together by a signal bus 812. A raw data sensor 814 is coupled to the A/D 802. The raw data sensor 814 is used to input data including patterns to be recognized. The nature of the raw data sensor 814 depends on the nature of the data that includes patterns to be recognized. For example, for speech, the raw data sensor 814 comprises a microphone, whereas for object recognition (e.g., face recognition) the raw data sensor 814 can comprise a camera. The data input through the raw data sensor 814 is digitized by the A/D 802 and supplied to the processor 808. The processor 808 executes one or more statistical pattern recognition programs using statistical pattern recognition models including parameters that have been optimized using the system 100 shown in FIG. 1 or the part of the method 200 shown in FIGS. 2-4. The one or more programs and the parameters are stored in the program memory 804. The workspace memory 806 is used in executing the one or more programs. The user interface 810 is used to output the recognition result or information based on the recognition result. The user interface 810 can for example comprise a display screen and/or a loudspeaker.

Rather than having the parts of the device co-located, the parts can be physically separated but coupled together through one or more communication links, such as, for example optical, wireline or wireless communication links. For example, a communication link can be inserted between the A/D 802 and the signal bus 812 and/or a communication link can be inserted between the signal bus 812 and the user interface 810.

While the preferred and other embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

What is claimed is:

1. A method of operating a pattern recognition system for refining a plurality of statistical pattern recognition models that are used for statistical pattern recognition, the method including:

reading in initial values of a set of parameters for said plurality of statistical pattern recognition models;

reading a training data set that includes a plurality of training data items including training data items for each of said plurality of statistical pattern recognition models, along with a transcribed identity for each of said plurality of training data items;

obtaining feature vectors from each of the plurality of training data items;

using a processor to perform an optimization routine for optimizing an objective function in order to find refined values of said set of parameters for said plurality of said statistical pattern recognition models corresponding to an extremum of said objective function, wherein said objective function is dynamically defined for each of a succession of iterations of said optimization routine to include a subexpression for each $k^{th}$ item of training data in, at least, a subset of said plurality of training data items that is defined by, at least, a first criterion that requires that said transcribed identity does not match a recognized identity for said $k^{th}$ item of training data, and a second criterion that requires that there is not a gross discrepancy between said transcribed identity and said recognized identity, wherein each subexpression depends on a relative magnitude of a first probability score compared to a second probability score, wherein said first probability score is based on a value of a first statistical pattern recognition model corresponding to said recognized identity of said $k^{th}$ item of training data evaluated with said one or more feature vectors obtained from said $k^{th}$ item of training data and said second probability score is based on a value of a second statistical pattern recognition model corresponding to said transcribed identity of said $k^{th}$ item of training data evaluated with said one or more feature vectors obtained from said $k^{th}$ item of training data; and using the refined statistical pattern recognition models to recognize a pattern.

2. The method according to claim 1 wherein optimizing said objective function comprises:

repeatedly evaluating said objective function in order to find an extremum of said objective function, wherein evaluating said objective function comprises:

for each $k^{th}$ item of training data in said subset of said plurality of training data items:

performing pattern recognition using one or more feature vectors obtained from said $k^{th}$ item of training data in order to determine a recognized identity for said $k^{th}$ item of training data and compute a first probability score for said recognized identity of said $k^{th}$ item of training data;

evaluating a pattern recognition model corresponding to said transcribed identity of said $k^{th}$ item of training data with said one or more feature vectors obtained from said $k^{th}$ item of training data in order to determine a second probability score for said transcribed identity of said $k^{th}$ item of training data; and changing a magnitude of said objective function by an amount that depends on a relative magnitude of said first probability score and said second probability score.

3. The method according to claim 1 wherein:

using a processor to perform said optimization routine comprises invoking an optimization routine that uses derivative information; and wherein optimizing said objective function comprises:

while one or more stopping criteria is not met, for each of a succession of iterations of said optimization routine:

for each $k^{th}$ item of training data in said subset of said plurality of training data items:

evaluating a gradient of a term of said objective function corresponding to said $k^{th}$ item of training data with respect to model parameters for said first statistical pattern recognition model and said second statistical pattern recognition model at said one or more feature vectors obtained from said $k^{th}$ item of training data to obtain a plurality of gradient component summands;

summing said plurality of gradient component summands over said subset of said plurality of training data items to obtain a plurality of gradient component sums;

using said optimization routine that uses derivative information to update values of said model parameters based on said gradient component sums; and when said one or more stopping criteria is met, storing a last set of values of said model parameters.

4. The method according to claim 3 wherein said optimization routine that uses derivative information comprises the method of steepest descent.

5. The method according to claim 1 wherein said subexpression comprises a difference between said first probability score and said second probability score.

6. The method according to claim 5 wherein said subexpression comprises a sigmoid function of said difference.

7. The method according to claim 1 wherein reading said training data set that includes said plurality of training data items comprises:

reading a set of speech samples wherein said transcribed identity identifies words spoken in said set of speech samples; and recognizing each particular item of training data using a search algorithm to find a highly likely path of a Hidden Markov Model.

8. The method according to claim 1 wherein for each of said succession of iterations, for each $i^{th}$ item of training data in said training data set, determining whether said second criterion is met by a process comprising:

comparing a magnitude of a function that depends on a relative magnitude of said first probability score and said second probability score to a predetermined value.

9. The method according to claim 8 wherein said function that depends on said relative magnitude of said first probability score and said second probability score is a difference between said first probability score and said second probability score.

10. The method according to claim 1 wherein for each of said succession of iterations, for each $i^{th}$ item of training data, determining whether said second criterion is satisfied by a process comprising checking that said recognized identity is within a confusability group for said transcribed identity.

11. The method according to claim 10 wherein said confusability group for said transcribed identity includes other patterns for which a likelihood of confusability with said transcribed identity is above a predetermined threshold.

12. The method according to claim 10 wherein said confusability group for said transcribed identity includes a number of other patterns that are most likely, among an entire set of patterns to be recognized, to be confused with said transcribed identity.

13. The method according to claim 10 wherein said confusability group for said transcribed identity includes a predetermined group of patterns.

14. A method of operating a pattern recognition system for refining a plurality of statistical pattern recognition models that are used for statistical pattern recognition, the method including:

reading in initial values of a set of parameters for said plurality of statistical pattern recognition models;

reading a training data set that includes a plurality of training data items including training data items for each of said plurality of statistical pattern recognition models, along with a transcribed identity for each of said plurality of training data items;

obtaining feature vectors from each of the plurality of training data items;

using a processor to perform an optimization routine for optimizing an objective function in order to find refined values of said set of parameters for said plurality of said statistical pattern recognition models corresponding to an extremum of said objective function, wherein said objective function is dynamically defined for each of a succession of iterations of said optimization routine to include a subexpression for each $k^{th}$ item of training data in, at least, a subset of said plurality of training data items that is defined by, at least, a first criterion that requires that said transcribed identity does not match a recognized identity for said $k^{th}$ item of training data, wherein each subexpression depends on a relative magnitude of a first probability score compared to a second probability score, wherein said first probability score is based on a value of a first statistical pattern recognition model corresponding to said recognized identity of said $k^{th}$ item of training data evaluated with said one or more feature vectors obtained from said $k^{th}$ item of training data and said second probability score is based on a value of a second statistical pattern recognition model corresponding to said transcribed identity of said $k^{th}$ item of training data evaluated with said one or more feature vectors obtained from said $k^{th}$ item of training data, wherein a value of said subexpression of said objective function for each $k^{th}$ item of training data is increased by applying an emphasis function that is determined based, at least in part, on said transcribed identity; and using the refined statistical pattern recognition models to recognize a pattern.

15. The method according to claim 14 wherein:

said emphasis function is chosen to increase said value of said subexpression to a greater degree if said transcribed identity is in a predetermined group of high priority patterns;

whereby, in refining said plurality of statistical pattern recognition models, emphasis is placed on said predetermined group of high priority patterns.

16. The method according to claim 14 wherein said emphasis function is determined based on, at least, said recognized identity.

17. The method according to claim 14 wherein applying said emphasis function comprises multiplying by a weight.

18. The method according to claim 17 wherein:

for each $k^{th}$ item of training data in said subset of said plurality of training data items:
   said transcribed identity and said recognized identity are compared to determine if a type of error selected from a group consisting of an insertion error, a deletion error and a substitution error has occurred;
   a first predetermined value is used as said weight if an insertion error has occurred;
   a second predetermined value is used as said weight if a deletion error has occurred; and
   a third predetermined value is used as said weight if a substitution error has occurred.

19. The method according to claim 17 wherein:

for each $k^{th}$ item of training data in said subset of said plurality of training data items:
   if said transcribed identity has a probability of confusion with said recognized identity that is above a predetermined threshold, said weight is increased.

20. A method of performing statistical pattern recognition comprising a method of operating a pattern recognition system for refining a plurality of statistical pattern recognition models that are used for statistical pattern recognition, the method including:

reading in initial values of a set of parameters for said plurality of statistical pattern recognition models;

reading a set of training data including a plurality of items of training data each of which is identified by a transcribed identity;

obtaining one or more feature vectors from each $k^{th}$ item of training data in said set of training data;

using a processor while one or more stopping criteria is not met to:
   for each $k^{th}$ item of training data in said set of training data training data:
      performing pattern recognition on said $k^{th}$ item of training data using a current set of values of said set of parameters for said plurality of statistical pattern recognition models in order to determine a recognized identity for said $k^{th}$ item of training data by finding a first statistical pattern recognition model, corresponding to said recognized identity, among said plurality of statistical pattern recognition models that yields a highest score when evaluated with said one or more feature vectors obtained from said $k^{th}$ item of training data;
      if a training data qualification criteria, that requires that said recognized identity does not match said transcribed identity, and that there is not a gross discrepancy between said transcribed identity and said recognized identity, is met for said $k^{th}$ item of training data:
         evaluating a gradient of a function that depends on a relative magnitude of said first statistical pattern recognition model compared to a second statistical pattern recognition model corresponding to said transcribed identity of said $k^{th}$ item of training data with respect to model parameters for said first statistical pattern recognition model and of said second statistical pattern recognition model at said one or more feature vectors obtained from said $k^{th}$ item of training data to obtain a plurality of gradient component summands;
   taking a plurality of component-by-component sums of said plurality of gradient component summands by summing over a subset of said set training data for which said training data qualification criteria is met;
   using said plurality of component-by-component sums of said plurality of gradient component summands in a gradient-based optimization method to update said current set of values of said set of parameters for said plurality of statistical pattern recognition models;
when said one or more stopping criteria is met, storing said current set of values of said set of parameters for said plurality of statistical pattern recognition models; and
using the refined statistical pattern recognition models to recognize a pattern.

21. An apparatus for performing statistical pattern recognition, the apparatus comprising:

a data input for inputting data including one or more unknown patterns;

a processor coupled to said data input for receiving said data;

a memory including programming instructions coupled to said processor, wherein said processor is programmed by said programming instructions to perform statistical pattern recognition on said data using a plurality of statistical pattern recognition models that include model parameters that have values resulting from a process comprising:
   reading in initial values of a set of parameters for said plurality of statistical pattern recognition models;
   reading a training data set that includes a plurality of training data items including training data items for each of said plurality of statistical pattern recognition models, along with a transcribed identity for each of said plurality of training data items;

obtaining feature vectors from each of the plurality of training data items;

invoking an optimization routine for optimizing an objective function in order to find refined values of said set of parameters for said plurality of said statistical pattern recognition models corresponding to an extremum of said objective function, wherein said objective function is dynamically defined for each of a succession of iterations of said optimization routine to include a subexpression for each $k^{th}$ item of training data in, at least, a subset of said plurality of training data items that is defined by, at least, a first criteria that requires that said transcribed identity does not match a recognized identity for said $k^{th}$ item of training data, and a second criteria that requires that there is not a gross discrepancy between said transcribed identity and said recognized identity, wherein each subexpression depends on a relative magnitude of a first probability score compared to a second probability score, wherein said first probability score is based on a value of a first statistical pattern recognition model corresponding to said recognized identity of said $k^{th}$ item of training data evaluated with said one or more feature vectors obtained from said $k^{th}$ item of training data and said second probability score is based on a value of a second statistical pattern recognition model corresponding to said transcribed identity of said $k^{th}$ item of training data evaluated with said one or more feature vectors obtained from said $k^{th}$ item of training data; and using the refined statistical pattern recognition models to recognize a pattern.

22. A computer readable medium storing programming instructions for operating a pattern recognition system for refining a plurality of statistical pattern recognition models that are used for statistical pattern recognition including programming instructions for:

reading in initial values of a set of parameters for said plurality of statistical pattern recognition models;

reading a training data set that includes a plurality of training data items including training data items for each of said plurality of statistical pattern recognition models, along with a transcribed identity for each of said plurality of training data items;

obtaining feature vectors from each of the plurality of training data items;

using a processor to perform an optimization routine for optimizing an objective function in order to find a plurality of values of parameters for said plurality of said statistical pattern recognition models corresponding to an extremum of said objective function, wherein said objective function is dynamically defined for each of a succession of iterations of said optimization routine to include a subexpression for each $k^{th}$ item of training data in, at least, a subset of said plurality of training data items that is defined by, at least, a first criteria that requires that said transcribed identity does not match a recognized identity for said $k^{th}$ item of training data, wherein each subexpression depends on a relative magnitude of a first probability score compared to a second probability score, wherein said first probability score is based on a value of a first statistical pattern recognition model corresponding to said recognized identity of said $k^{th}$ item of training data evaluated with one or more feature vectors obtained from said $k^{th}$ item of training data and said second probability score is based on a value of a second statistical pattern recognition model corresponding to said transcribed identity of said $k^{th}$ item of training data evaluated with said one or more feature vectors obtained from said $k^{th}$ item of training data, wherein a value of said subexpression of said objective function for each $k^{th}$ item of training data is increased by applying an emphasis function that is determined based, at least in part, on said transcribed identity; and using the refined statistical pattern recognition models to recognize a pattern.

* * * * *